(12) United States Patent
Kohnke et al.

(10) Patent No.: US 8,440,751 B2
(45) Date of Patent: May 14, 2013

(54) REDUCED PHOSPHORUS (TBEP) FLOOR COATINGS

(75) Inventors: Timothy John Kohnke, Eagan, MN (US); Dale Curtis Larson, III, Eagan, MN (US); Robert D. P. Hei, Baldwin, WI (US); Minyu Li, Oakdale, MN (US); Catherine Hanson, Hastings, MN (US)

(73) Assignee: Ecolab USA Inc., Saint Paul, MN (US)

( * ) Notice: Subject to any disclaimer, the term of this patent is extended or adjusted under 35 U.S.C. 154(b) by 431 days.

(21) Appl. No.: 12/782,300

(22) Filed: May 18, 2010

(65) Prior Publication Data

US 2011/0287187 A1 Nov. 24, 2011

(51) Int. Cl.
| | |
|---|---|
| C08K 5/10 | (2006.01) |
| C08K 5/105 | (2006.01) |
| C08K 5/103 | (2006.01) |
| C08K 5/101 | (2006.01) |
| C08L 33/08 | (2006.01) |
| C08L 33/10 | (2006.01) |
| C09G 1/16 | (2006.01) |

(52) U.S. Cl.
USPC ........... 524/284; 524/287; 524/292; 524/293; 524/299; 524/317; 524/556; 524/560; 524/543; 524/306; 106/3; 106/11; 106/287.26

(58) Field of Classification Search .................. 524/284, 524/287, 292, 293, 299, 315, 317, 560; 106/3, 106/11, 287.26
See application file for complete search history.

(56) References Cited

U.S. PATENT DOCUMENTS

| | | | |
|---|---|---|---|
| 6,403,546 | B1 | 6/2002 | Hernandez et al. |
| 7,056,966 | B2 | 6/2006 | Stanhope et al. |
| 7,378,381 | B2 | 5/2008 | Arai et al. |
| 2002/0153000 | A1 | 10/2002 | Holland et al. |
| 2004/0068035 | A1 | 4/2004 | Paiva et al. |
| 2005/0101728 | A1 | 5/2005 | Tortorelli |
| 2005/0215678 | A1 | 9/2005 | Ludtke et al. |
| 2005/0245420 | A1 | 11/2005 | Lewis et al. |
| 2008/0076861 | A1* | 3/2008 | Strepka et al. ................ 524/287 |
| 2008/0299405 | A1 | 12/2008 | Wang et al. |

FOREIGN PATENT DOCUMENTS

| | | |
|---|---|---|
| EP | 0228481 A1 | 7/1987 |
| EP | 1 288 254 A1 | 3/2003 |
| EP | 1 529 787 A1 | 5/2005 |
| EP | 1627903 A1 | 2/2006 |
| EP | 1 529 787 B1 | 3/2006 |
| GB | 1003363 | 9/1965 |
| WO | WO 98/27162 A1 | 6/1998 |
| WO | WO 01/29140 A1 | 4/2001 |
| WO | WO 03/020814 A1 | 3/2003 |
| WO | WO 03/020814 A8 | 3/2003 |
| WO | WO 2004/096927 A1 | 11/2004 |

OTHER PUBLICATIONS

"Benzoflex(R) FP-321 Floor Polish Formulation Guide" Velsicol Chemical Corporation, 12 Pages.
ECOLAB USA Inc. et al., PCT/IB2011/052040, International Search Report and Written Opinion mailed Feb. 9, 2012, 11 pages.

* cited by examiner

*Primary Examiner* — Michael M Bernshteyn
(74) *Attorney, Agent, or Firm* — McKee, Voorhees & Sease, P.L.C.

(57) ABSTRACT

The invention provides an aqueous floor coating composition, comprising water, at least one polymer film forming agent, and a plasticizing agent, wherein at least a portion of the plasticizing agent is a synergistic combination of tributoxyethyl phosphate and a benzoate ester blend. Such compositions have reduced phosphorus content, yet retain the leveling and gloss of tributoxyethyl phosphate plasticizers and also exhibit improved soil resistance.

26 Claims, 1 Drawing Sheet

US 8,440,751 B2

REDUCED PHOSPHORUS (TBEP) FLOOR COATINGS

FIELD OF THE INVENTION

This invention relates to plasticized floor coating compositions. More particularly, this invention relates to floor coating compositions containing an organic polymer as the floor coating material and a blend of tributoxyethyl phosphate and benzoate esters as the plasticizer. This blend retains the good leveling and gloss characteristics of phosphate plasticizers but with improved soil resistance with a lower phosphorus content.

BACKGROUND OF THE INVENTION

Aqueous coating compositions are well known and find use as protective coatings for various substrates such as wood, stone, plastic and the like. Such compositions typically contain a film-forming polymer such as an acrylic polymer. That polymer forms a continuous protective coating over the substrate, often in conjunction with other additive materials such as other polymers, resins, waxes, pigments, dyes, ultraviolet light absorbing agents and the like, to help protect it from damage caused by the sun, abrasion, foot traffic, pressure, soiling, and so forth. The film-forming polymers are typically selected for their physical properties such as water resistance, flexibility, removability, hardness, resilience, toughness, scratch and marking resistant (black heel marks) to fit the needs of the substrate being protected and the environment in which the coating will be used.

A major impediment to good coating or film formation is low temperature during application of the composition. The film forming polymers used in floor coating compositions normally have minimum film formation temperatures (MFT) well above room temperature. Typically, plasticizers and coalescents are used to reduce the MFT of the finish so that film formation will occur at floor surface temperatures as low as 50° F. (10° C.). If the temperature of the floor falls below the MFT of the finish, a properly fused film will not form. There have been many cases where a product performed well on the upper floors of a building, but the cooler ground floor exhibited a powdering problem. The phenomenon known as evaporative cooling will also reduce the temperature of the floor as the finish dries.

A plasticizing agent is typically a compound or a mixture that can associate with the polymer and thereby modify the physical properties of the polymer or of the coating composition itself. For example, a plasticizing agent may serve to change the hardness, flexibility, glass transition temperature (Tg) to form a continuous film. A coating composition without plasticizers may dry to a powder and become useless. Therefore, the amounts and types of the various plasticizers required to produce an optimized floor finish film are of critical importance. Of course, other factors also affect the film formation process, such as temperature, humidity and nature of the substrate. The right plasticizing agent in the right amount imparts desirable properties to the film left behind when the coating composition is applied to the substrate and the volatile components are removed such as by drying. These desirable results are achieved by the plasticizing agent without having to change the nature of the coating polymer itself or having to obtain additional properties not possible from modification of the coating polymer itself.

There are two types of plasticizers: permanent and fugitive. The fugitive plasticizers are also referred to as coalescents. Both types of plasticizers are required in a balanced floor finish and have a significant effect on the performance of a film. Permanent plasticizers are absorbed completely by the polymer and other solid components upon drying and remain in the film to provide continuing plasticization. Coalescents, which volatilize during the drying process, are used to temporarily lower the MFT of a coating composition during the drying phase. The evaporation rate of the fugitive plasticizers or coalescents must be carefully evaluated, so that proper film formation will be accomplished before the coating composition has completely dried. If the evaporation rate of the coalescents is too slow, the film will remain soft and even tacky after drying.

A permanent plasticizer of special significance in floor coating compositions is tributoxyethyl phosphate (TBEP). As a result of its hydrophobicity (solubility in water is 0.2%), TBEP resides on or inside the polymer particles in a wet composition. With a solubility parameter of 8.7 TBEP is predictably a good solvent for acrylate-styrene copolymers, however, it also acts as an effective leveling agent, for reasons not well understood.

When removing a floor coating composition containing tributoxyethyl phosphate, the waste water contains phosphorus, an environmentally undesirable contaminant. Therefore, there is a need for coating compositions using less phosphorus as plasticizers.

SUMMARY OF THE INVENTION

The invention provides an aqueous floor coating composition comprising a plasticizer with reduced phosphorus content. The aqueous floor coating composition is water based, preferably zinc free and comprises a specific combination of TBEP and benzoate ester blend.

Thus, in one embodiment the invention comprises an alkali-soluble, or organic polymer coating composition, comprising water, at least one alkali-soluble or organic polymeric film forming agent. The plasticizer combination is a specific ratio of TBEP and benzoic ester blend and has one or more improved properties such as improved leveling and/or soil removal over either of the plasticizers alone.

Applicants have found that a floor coating compositions with a plasticizer comprising a blend of at least 40% by weight of TBEP in the plasticizer component preferably 40-60% by weight of TBEP with the remainder comprising a blend of benzoate esters provides a good leveling and gloss with superior soil resistance than TBEP alone.

It is further preferred that, based on the total composition, the total amount of the above-mentioned plasticizer preferably included according to the invention is from about 2 to 35% by weight, preferably from about 2 to 20% by weight.

DETAILED DESCRIPTION OF THE INVENTION

Definitions

Figure 1:
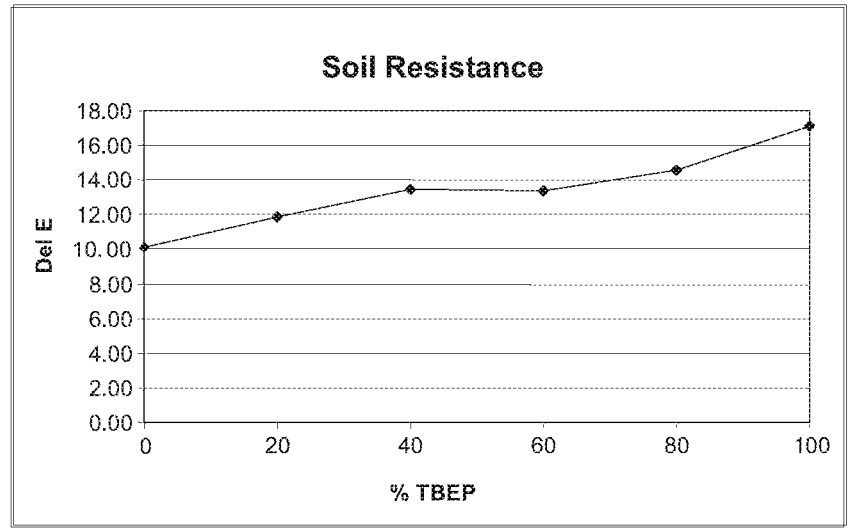
FIG. 1 is a graph showing the soil resistance of the plasticizers of the invention with increasing levels of TBEP and the remainder being a blend of benzoate esters. One can see that at 40% to 60% TBEP, the plasticizer has improved soil resistance when compared to TBEP alone.

The following detailed description describes certain illustrative embodiments and is not to be taken in a limiting sense. All weights, amounts and ratios are by weight, unless otherwise specifically noted. Unless the context indicates otherwise the following terms shall have the following meaning and shall be applicable to the singular and plural:

The terms "a," "an," "the," "at least one," and "one or more" are used interchangeably. Thus a cleaning product that contains "a" magnesium compound may include "one or more" magnesium compounds.

The term "about" modifying the quantity of an ingredient in a composition or mixture or employed in the disclosed methods refers to variations such as may occur, for example, through typical measuring and liquid handling procedures used for making concentrates or use solutions in the real world; through inadvertent error in these procedures; through differences in the manufacture, source, or purity of the ingredients employed to make the compositions or carry out the methods; and the like. The term about also encompasses amounts that differ due to different equilibrium conditions for a composition made from a particular initial mixture. Whether or not modified by the term "about", the claims include equivalents to the recited quantities.

The term "hard surface" refers to a non-resilient cleanable substrate, for example materials made from ceramic, stone, glass or hard plastics including showers, sinks, toilets, bathtubs, countertops, windows, mirrors, transportation vehicles, walls, wooden or tile floors, patient-care equipment (for example diagnostic equipment, shunts, body scopes, wheel chairs, bed frames, etc.), surgical equipment and the like.

The term "floor surface" refers to any flooring surface whether uncoated or finished with a polymeric coating such as, for example stone, plastic, wood, linoleum, vinyl composite tile (VCT) or the like.

The terms "include" and "including" when used in reference to a list of materials refer to but are not limited to the materials so listed.

As used herein, "optimizing or optimal film properties" refers to a film having a hardness of 40 seconds, preferably about 60 to about 130 seconds as determined by ASTM D4366 over glass, for a matte floor finishes a 20° gloss of at least less than 30, preferably less than 20, for medium and high gloss finishes a 20° gloss of at least about 20, preferably about 40 to about 80, resistance to soiling resulting in a minimum change in color, preferably less than about 25 $\Delta E$ units, the ability to be recoated without an indication of coating defect or the dragging of the applicator, a resistance to spotting by water of displaying no signs of discoloration, swelling of degradation of the film and the ability to level during application and drying with minimal indication of the applicator streaking, preferably no indication.

Unless otherwise indicated, the term "solid percentage" shall include components of the finish composition retained after sufficient drying.

The term "solid" refers to a composition in a generally shape-stable form under expected storage conditions, for example a powder, particle, agglomerate, flake, granule, pellet, tablet, lozenge, puck, briquette, brick or block, and whether in a unit dose or a portion from which measured unit doses may be withdrawn. A solid may have varying degrees of shape stability, but typically will not flow perceptibly and will substantially retain its shape under moderate stress, pressure or mere gravity, as for example, when a molded solid is removed from a mold, when an extruded solid exits an extruder, and the like. A solid may have varying degrees of surface hardness, and for example may range from that of a fused solid block whose surface is relatively dense and hard, resembling concrete, to a consistency characterized as being malleable and sponge-like, resembling a cured caulking material.

The term "water soluble" refers to a compound that can be dissolved in water at a concentration of more than 1 wt. %. The terms "sparingly soluble" or "sparingly water soluble" refer to a compound that can be dissolved in water only to a concentration of 0.1 to 1.0 wt. %. The term "water insoluble" refers to a compound that can be dissolved in water only to a concentration of less than 0.1 wt. %.

Coating Compositions

Preferred embodiments of the present compositions are coating compositions for protecting and beautifying flooring surfaces formed of wood, stone, and plastics that may be coated with a film of an organic polymer. The coating compositions are aqueous formulations comprising a film-forming organic polymer an optional crosslinking agent combined with the present TBEP/benzoate ester blend plasticizer compositions.

The organic polymers include copolymers of styrene or vinyl toluene with at least one $\alpha$-$\beta$-monoethylenically unsaturated acid or anhydride such as styrene-maleic anhydride resins, rosin/maleic anhydride adducts which are condensed with polyols, and the like.

Commercially available acrylic polymers suitable for the compositions of the invention include, but are not limited to, methyl methacrylate/butyl acrylate/methacrylic acid (MMA/BA/MAA) copolymers, methyl methacrylate/butyl acrylate/acrylic acid (MMA/BA/AA) polymers, and the like.

Suitable commercially available styrene-acrylic polymers include, but are not limited to, styrene/methyl methacrylate/butyl acrylate/methacrylic acid (S/MMA/BA/MMA) copolymers, styrene/methyl methacrylate/butyl acrylate/acrylic acid (S/MMA/BA/AA) copolymers, and the like. Commercially available acrylic polymers suitable for floor coating composition include, for example, Mor-Glo 2, a 38% active emulsion from Omnova Solutions, Inc., of Chester S.C.

The coating composition typically contains between about 5 and 60 weight percent and preferably between about 10 and 40 weight percent more preferably 15 to 30 solid weight percentage of the formulation.

The coating composition can also contain polyvalent metal compounds which provide crosslinking of the polymers in the film and increase certain properties of the finish, such as coating removability with alkaline chemistries, and the detergent resistance of the finish.

Suitable polyvalent metals include beryllium, cadmium, copper, calcium, magnesium, zinc, zirconium, barium, strontium, aluminum, bismuth, antimony, lead, cobalt, iron, nickel, and the like. Although the polyvalent metal compound can be added to the composition in dry form such as powder, it is preferably added as a solution. The polyvalent metal compound is typically a metal complex, a metal salt of an organic acid, or a metal chelate. In a preferred embodiment, the polyvalent metal is a metal other than zinc. The ammonia and amine complexes of these metals are particularly useful because of their high solubility. Amines capable of complexing many metals include, for example, monoethanol amine, diethylaminoethanol, and ethylenediamine. Polyvalent metal complexes and salts of organic acids are typically soluble in an alkaline pH range. Anions of organic acids include acetate, formate, carbonate, glycolate, octanoate, benzoate, bluconate, oxalate, lactate, and the like. Polyvalent metal chelates where the ligand is a bidentate amino acid such as glycine or alanine can also be used. Calcium is a preferred polyvalent metal ion. In some applications, a fugitive ligand such as ammonia is preferred. A ligand is considered fugitive if at least a portion of the ligand tends to volatilize as the finish dries to form a film on the substrate.

The waxes, wax emulsions, and wax dispersions or mixtures of waxes that can be used include waxes of a vegetable, animal, synthetic, and/or mineral origin. Representative waxes include, for example, carnuba, candelilla, lanolin, stearin, beeswax, oxidized polyethylene wax, polyethylene emulsions, polypropylene, copolymers of ethylene and acrylic esters, hydrogenated coconut oil or soybean oil, and the mineral waxes such as paraffin or ceresin. The waxes typically range from 0 to about 10 weight percent of the raw weight of the total preferably from about 1 to about 5 weight percent of the finish composition.

The coating composition can optionally include an alkali-soluble resin. Such resins may be natural resins or polymers, including but not limited to rosin resin, or synthetic resins or polymers, including but not limited to addition polymers including acrylic polymers and styrene/acrylic polymers or condensation polymers including polyester polymers, polyurethane polymers, polyether polymers, polyaldehyde polymers, polycarbonates and polyamides. These typically have a low molecular weight of about 500-2000 and high acid numbers to permit solubility in water and ammonia or other alkalis. Resins are used to enhance gloss, leveling and by virtue of their solubility, removability. The resins are often used as a conventional resin cut, which is an aqueous solution of the resin with an alkaline substance having a fugitive cation such as ammonium hydroxide. The optional alkali-soluble resin can comprise from about 0-10% preferably 0-5% by weight of the composition.

The coating composition typically contains from about 0.1 to about 40 solid weight percent plasticizer, preferably 1-20 based on the weight of the finish composition. The plasticizer facilitates film formation at desired temperatures when the coating is applied to a substrate. A fugitive or semi-fugitive plasticizer is a plasticizer that at least partially evaporates as the coating dries. Permanent plasticizers do not evaporate substantially. Mixtures of fugitive and permanent plasticizers can be used. The particular plasticizer and the amount used are chosen in accordance with the demand for compatibility with the formulation, efficiency in lowering the film-forming temperature, and clarity of the coating.

Fugitive plasticizers or coalescents include, for example, the monobutyl, monoethyl, monomethyl or other monoalkyl ethers of diethylene glycol or dipropyleneglycol, isophorone, benzyl alcohol, butyl cellosolve, and 3-methoxybutanol-1. Permanent plasticizers include, for example, benzyl butyl phthalate, dibutyl phthalate, dimethyl phthalate, triphenyl phosphate, 2-ethyl hexyl benzylphthalate, fatty oil acid esters of caprolactam, acetyl tributyl citrate, toluene ethyl sulfonamide, tributoxyethyl phosphate, and tributyl phosphate.

The coating compositions of the invention typically have a solids content from about 10 to about 50 weight percent. In one embodiment, the solids range from about 10 to about 30 weight percent and preferably from about 15 to about 25 weight percent based on the weight of the finish composition. In another embodiment of the invention, a concentrated finish composition is provided containing up to about 35 to about 50 weight percent solids based on the weight of the finish composition. Such concentrated compositions are diluted prior to use by either mixing the concentrate with water or by applying the finish with a wet mop or applicator.

The pH of the coating composition is typically in the range of about 6 to about 10.5. Preferably, the pH is between about 7.5 and about 9.9. The pH can be adjusted using various bases, acids (such as citric, acetic, lactic, etc) or buffering agents. Suitable bases or buffering agents include, for example, sodium hydroxide, alkali phosphates, alkali silicates, alkali carbonates, ammonia, and amines such as diethanolamine or triethanolamine.

In another aspect, the coating composition may include but is not limited to an additive selected from the group consisting of biocidal agents, wetting agents, surfactant, defoamers, stabilizers, anti-slip agents including organic and inorganic particles, other performance enhancers such as polyurethane, whitening agents, polycarbonate, anti-soiling/stain blocking agents or matting agent and/or mixtures thereof. The composition may further include a crosslinking agent selected from the group consisting of aliphatic amines, cycloaliphatic amines, aromatic amines, carboxylic acids and mixtures thereof.

Examples of conventional plasticizing agents include permanent plasticizers that remain in the film after drying such as butyl benzyl phthalate, dibutyl phthalate, dimethyl phthalate, triphenyl phosphate, 2-ethylhexyl benzyl phthalate, butyl cyclohexyl phthalate, mixed benzoic acid and fatty oil acid esters of pentaerythritol, poly(propylene adipate) dibenzoate, diethylene glycol dibenzoate, tetrabutylthiodi-succinate, butyl phthalyl butyl glycolate, triethyl citrate, acetyl triethyl citrate, tributyl citrate, acetyl tributyl citrate, dibenzyl sebacate, tricresyl phosphate, tributoxyethyl phosphate, toluene ethyl sulfonamide, the di-2-ethylhexyl ester of hexamethylene glycol diphthalate, di-(methylcyclohexyl)-phthalate, and tributyl phosphate. In conventional aqueous finish compositions based on acrylic film-forming polymers, tributoxyethyl phosphate, such as that sold under the trade name KP-140 sold by Great Lakes Performance Additives and Fluids of West Lafayette, Ind., is the traditional plasticizing agent of choice. Applicants' invention replaces these agents with a TBEP/benzoate ester blend, thereby reducing phosphorus content.

TBEP has been used for many years as a leveling/plasticizing agent for acrylic water based floor finishes, because TBEP has a special ability to provide flow and leveling that is not found with other commercially available plasticizers. In addition, it provides a clear high gloss coating. Each of these attributes is critical for a successful floor finish.

The present invention involves a new plasticizer composition for use in such products. Most attempts at reducing phosphorus from the use of TBEP have involved attempts to replace TBEP completely, however these attempts have been unable to reproduce the excellent leveling and gloss provided by TBEP. Applicants have surprisingly found that with a specific ratio of TBEP to benzoate ester blend, the beneficial leveling and gloss properties are retained and the soil resistance was improved to levels greater than with TBEP alone. Thus applications provide a floor coating composition with reduced phosphorus, that performs at least as well as TBEP in leveling and gloss and further has improved soil resistance.

This provides a reduced phosphorus floor coating composition and more environmentally friendly product.

The invention includes a water based, preferably zinc-free polymer floor finish coating with a plasticizer mixture having 40-60% blend of TBEP/benzoate esters. In other embodiments the plasticizer containing coating composition includes less than 1% volatile organic compounds (VOCs). VOCs have been found to be a major contributing factor to ozone, a common air pollutant. Ozone is not emitted into the air, but actually formed in the atmosphere through a photochemical process. VOCs in the air react with oxides of nitrogen and sunlight to form ozone. For this reason, the Environmental Protection Agency has determined that controlling VOCs is an effective method for minimizing ozone levels. The California Air Resource Board (CARB) and several northeastern states that are members of the Ozone Transport Commission (OTC) are now regulating the VOC (volatile organic compound) levels of many consumer products with the goal of improving air quality. Consumer products is defined very broadly in these regulations and includes many commercial and institutional products including car care products—in addition to household product. Thus the floor finish composition preferably has less than 1% VOCs.

The TBEP to benzoate esters blend in the plasticizer component is generally greater than zero (the ratio for TEBP at 40% is 0.67) but less than 1.5.

The present inventors discovered that the benzoic acid ester compositions can be blended with TBEP to reduce the amount of phosphorus containing agents used as plasticizers typically present in floor coating compositions. The film formed when the resultant formulation is applied to the polyvinyl chloride wear layer of a flooring material exhibits the leveling and gloss properties and has improved soil resistance when compared to TBEP containing control compositions.

The combination of desirable properties that characterize the plasticizers used in present floor coating compositions can be achieved when a three benzoic acid ester blend is combined with TBEP in the following relative concentrations by weight:
Benzoate of 8-carbon monocarboxylic acid—15-20%
Diethylene Glycol Dibenzoate—60-65%
Diethylene Glycol Monobenzoate—20-25%.

The properties imparted by 2-ethylhexyl benzoate (2-EHB), a preferred benzoic acid ester of an 8-carbon monohydric alcohol, are optimized when this ester is used in combination with diethylene glycol dibenzoate (DEGDB) and diethylene glycol monobenzoate (DEGMB) in the aforementioned proportions.

The blend of benzoic esters is described in Strepka et al, United States Published Application 20080076861 entitled "Film Forming Compositions Containing Mixtures of Benzoic Acid Esters" the disclosure if which is hereby incorporated in its entirety by reference. Such blends are commercially available under the series of Benzofex plasticizers from Genovique Specialties Corporation 10400 West Higgins Road Suite 600 Rosemont, Ill. 60018. Particularly preferred is Benzoflex FP 321.

The published application discloses the benzoic ester blend as a replacement for plasticizers. According to the publication, the blend of benzoic acid esters comprises a mixture of benzoic acid esters in an amount effective for optimizing film properties in a film formed from said film-forming composition, the mixture of benzoic acid esters including: (1) from about 15 to about 20 weight percent, based on the total weight of the mixture of benzoic acid esters, of an ester represented by the formula $PhCO(O)R^1$ where Ph represents a phenyl radical and $R^1$ represents a linear or branched alkyl radical containing 8 carbon atoms, (2) from about 60 to about 65 weight percent, based on the total weight of the mixture of benzoic acid esters, of diethylene glycol dibenzoate, and (3) from about 20 to about 25 weight percent, based on the total weight of the mixture of benzoic acid esters, of diethylene glycol monobenzoate. The application further details that in a preferred embodiment, $R^1$ is a 2-ethylhexyl. The mixture of benzoic acid esters may include about 17 weight percent of $PhCO(O)R^1$, about 62 weight percent diethylene glycol dibenzoate, and about 21 weight percent diethylene glycol monobenzoate.

Applicants have found that when the benzoate ester blend is used alone as a plasticizer it negatively impacts film forming properties such as initial gloss, film formation, and recoatability.

Applicants have identified a coating composition that requires no reduction in solvent, and which retains desired leveling and gloss characteristics, by means of a 40-60% blend TBEP/benzoate esters.

Applicants have demonstrated, contrary to floor coating compositions comprising a benzoate ester blend alone, that formulas with 40-60% of TBEP/benzoate esters can be high performance finishes, even with increased soiling resistance compared to 100% TBEP while still retaining the gloss of a 100% TBEP finish. In addition, the leveling of the novel formulations is significantly better than compositions with 100% benzoic ester blends.

The mixture of TBEP/benzoic acid esters is from about 0.1 to about 40 weight percent of the film forming composition, based on the total weight of the film forming composition. The polymer may be provided in aqueous medium and the aqueous medium may be about 10 to about 95 weight percent of the film forming composition, based on the total weight of the film forming composition. The film forming composition may be a liquid at temperatures greater than or equal to 5° C. (41 F).

Representative components of the floor coating are per below:

A solid weight formulation according to the invention is below:

| Component description | Percent weight of composition range | Preferred |
|---|---|---|
| Polymer/metal crosslinking complex (solids) | 10-40% | 12-30% |
| Wax (solids) | 0-10% | 0.5-5% |
| Alkali soluble resin (solids) | 0-10% | 0-5% |
| plasticizer | .1-40% | 2-20% |
| coalescent | 0-15% | 2-10% |
| Wetting aid | 0-10% | 0-1% |

Representative use formations at 30% solids is below:

| Component description | Percent weight of composition range | Preferred |
|---|---|---|
| Water | 10-95% | 40-80% |
| Polymer/metal crosslinking complex (solids) | 5-50% | 10-40% |
| Wax (solids) | 0-15% | 2-10% |
| Alkali soluble resin (solids) | 0-20% | 0-15% |
| plasticizer | .1-40% | 2-20% |
| coalescent | 0-10% | 2-5% |
| Wetting aid | 0-10% | 0-1% |

According to the invention, the plasticizer component comprises a blend of at least about 40% by weight of the plasticizer component of TBEP with the remainder being a benzoate ester blend. The preferred range of TBEP is 40%-60% with a most preferred range of 60%.

The floor finish composition can be applied to a variety of floor substrates. Representative flooring substrates include, for example, resilient substrates such as sheet goods (e.g., vinyl flooring, linoleum or rubber sheeting), vinyl composite tiles, vinyl asbestos tiles, rubber tiles, cork and synthetic sports floors, and non-resilient substrates such as concrete, stone, marble, wood, bamboo, ceramic tile, grout, Terrazzo and other poured or "dry shake" floors. The floor finish composition may be jobsite-applied to a flooring substrate after the substrate has been installed (e.g., to monolithic flooring substrates such as sheet vinyl goods, linoleum, cork, rubber sheeting, synthetic sports floors, concrete, stone, marble, grout or Terrazzo, or to multipiece flooring substrates such as vinyl composite tiles, wood floorboards or ceramic tiles), or can be factory-applied to a flooring substrate before it is installed (e.g., to monolithic flooring substrates such as sheet vinyl goods in roll form, or multipiece flooring substrates such as vinyl composite tiles or wood floorboards). Jobsite application is especially preferred, with suitable jobsites including indoor and outdoor sites involving new or existing residential, commercial and government- or agency-owned facilities.

The floor finish composition may also be used as a restorer composition to restore gloss to a floor. This would involve a dilution to desired performance levels, spray application to the floor and buffing. Such uses generally include a 1-5 dilution but may include even further dilutions depending on the desired performance level. Use of the finish composition as a restorer cleans and restores floors to a high gloss, reducing the need for more expensive, time-consuming stripping and recoating The disclosed floor coating composition can be applied using a variety of methods and tools, including spraying, brushing, flat or string mopping, roll coating, applying with a paint roller, applying with a T-bar applicator, and flood coating. Mop application, especially flat mopping, is preferred for coating most floors. Suitable mops include those described in U.S. Pat. Nos. 5,315,734, 5,390,390, 5,680,667 and 5,887, 311, the complete disclosures of which are hereby incorporated by reference in their entirety.

Typically, the floor should first be cleaned and any loose debris removed. In some embodiments, no undercoat layer or coat is applied to the floor. In other embodiments, one or more undercoat layers or coats (diluted if necessary with water or another suitable diluent, plasticizer, coalescent or cosolvent) may be applied to the floor. If undercoat is needed, one to three undercoat layers typically will be preferred. In yet other embodiments, one or more topcoat layers may be applied.

When multiple undercoat, or top coat layers are employed they can be the same or different. Each undercoat layer preferably will have a dry coating thickness of about 2.5 to about 25 microns, more preferably about 2.5 to about 15 microns. Preferably the overall undercoat dry coating thickness will be about 5 to about 100 microns, and more preferably about 5 to about 50 microns. If an undercoat is used, a topcoat may also be used. The topcoat may be the same as the undercoat or may be different. When a topcoat is used, one to seven layers typically will be preferred. Each topcoat layer will preferably have a dry coating thickness of about 2.5 to about 100 microns, more preferably from about 2.5 to 60 microns. It is to be understood that all values and ranges between these values and ranges are meant to be encompassed by the present invention.

Some non-limiting examples of suitable mop heads include string mops such as those available from Amsan; and flat mops such as those available from Rubbermaid, Unger or Ecolab. The mop head material can be made of for example, cotton, rayon, polyester, nylon or a combination thereof. The mop head is preferably a flat mop made of polyester and nylon microfiber. A typical application rate of the compositions of the invention is 2000 square feet per gallon, but other rates may be used depending upon the floor surface, leveling, and desired performance.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features.

EXAMPLES

The present invention is more particularly described in the following examples that are intended as illustrations only, since numerous modifications and variations within the scope of the present invention will be apparent to those skilled in the art. Unless otherwise noted, all parts, percentages, and ratios reported in the following examples are on a weight basis, and all reagents used in the examples were obtained, or are available, from the chemical suppliers described below, or may be synthesized by conventional techniques.

A typical floor coating composition was prepared according to the invention and comprising the following components at a 30% solids emulsion:

| | |
|---|---|
| Water (DI) | 10-95% |
| Diethylene Glycol Ethyl Ether (DE) (coalescing/temporary plasticizer) | 0-10% |
| PolyFox ™ TM-1 | <1% |
| SE-21 defoamer | <1% |
| NM ™-128 emulsion (38% Solids) | 15-90% |
| E-43 Nonionic emulsion (40%)/AC-325 Nonionic (35%) | 0-15% |

PolyFox is a fluorinated surfactant available from Omnova Solution, Fairlawn Ohio.

SE-21 is a poly(dimethyl siloxane) emulsion defoamer available from Wacker Chemical in Adrian Mich.

NM 128 is a poly(acrylic/styrene) emulsion which does not contain zinc as a crosslinking agent and is available from Omnova Solutions, Fairlawn Ohio E-43 is a low molecular weight polypropylene wax emulsion available from Michelman, Inc. in Cincinnati, Ohio AC-325 is low molecular weight polyethylene polymer (wax emulsion) available from Honeywell in Morristown, N.J.

The above floor coating composition was then used with different ratios of TBEP/benzoate ester blend as the plasticizer were prepared as per below. The table below gives the percent weight of TBEP in the plasticizer with the remainder being the benzoate ester blend. Amounts within the table are reported as a weight percentage of the entire floor coating composition.

| | % TBEP | | | | | |
|---|---|---|---|---|---|---|
| | 100 | 80 | 60 | 40 | 20 | 0 |
| Tributoxyethyl Phosphate (KP-140) | 2.85 | 2.28 | 1.71 | 1.14 | 0.57 | 0 |
| Benzoflex FP-321 | 0 | 0.57 | 1.14 | 1.71 | 2.28 | 2.85 |

Leveling Study

The six formulas tested were applied in two aisles of floors in the Floor care lab.

Ambient conditions were approximately 80 F and 15% RH. Each formula was applied over an area 8 feet long and 6 feet wide. Application was performed with a string mop and coatings were allowed to dry for approximately one hour in between coats. 5 coats were applied.

Once dry, the coatings were observed to note any differences in leveling. 3 different observers took part and sorted the finishes from best to worst. The conditions are % TBEP.
Observer A—100%=60%>80%>40%>20%>0%
Observer B—100%=80%=60%>40%>20%>0%
Observer C—100%>80%=60%>40%=20%>0%

Soiling

The six formulas were then tested for soil resistance using a Gardner abrasion tester per ASTM D3206-92. Generally, this test method covers the determination of soil resistance of floor coating compositions on test tiles. A carpet covered roller is used to simulate the action of foot traffic. A synthetic soil is employed in conjunction with the roller. The soiling is measured by color difference and reported as delta E. A lower delta E represents less soiling and improved soil resistance. The results are shown in FIG. 1. As can be seen, 100% TBEP had the worst soil resistance. At 40 to 60% benzoic ester blend ratio, the soil resistance was improved significantly.

Gloss

The six formulas were then tested for gloss. Gloss was measured with a BYK Micro-TRI-gloss glossmeter. 5 readings were taken per sample with the average reported.

Figure 2:
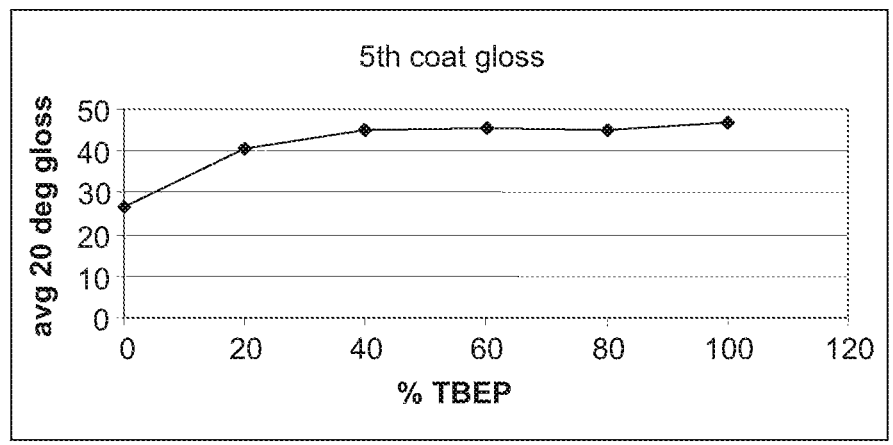
FIG. 2 is a graph showing results of the $5^{th}$ coat gloss of the finish containing plasticizers of the invention with increasing levels of TBEP and the remainder comprising a blend of benzoate esters. One can again see that a minimum of 40% TBEP, the gloss affects of TBEP are retained when blended with benzoate esters and are superior to the benzoate esters alone as a plasticizer.

Coatings were done on VCT at 2000 ft2/gal using a microfiber pad. 5 coats were applied with 30 minute dry times. This was a modified version of method B from ASTM D1436-97. A controlled environment of 57 F 22% relative humidity was used. The results are shown in FIG. 2. As can be seen at less than 40% TBEP, there is a significant reduction in the gloss, indicating that TBEP must be present in an amount of at least about 40% of the permanent plasticizer component of the floor coating composition.

What is claimed is:

1. An aqueous coating composition comprising:
   at least one organic polymeric film forming agent;
   a metal cross-linking agent selected from the alkaline earth metals; and
   a permanent plasticizing agent, wherein the plasticizing agent comprises from about 40% to about 60% of tributoxyethyl phosphate and from about 40% to about 60% a blend of benzoic esters comprising
   (a) from about 15 to about 20 weight percent actives based on the total weight of the mixture of benzoic acid esters, of an ester represented by the formula $PhCO(O)R^1$ where Ph represents a phenyl radical and $R^1$ represents a linear or branched alkyl radical containing 8 carbon atoms,
   (b) from about 60 to about 65 weight percent, based on the total weight of the mixture of benzoic acid esters, of diethylene glycol dibenzoate, and
   (c) from about 20 to about 25 weight percent, based on the total weight of the mixture of benzoic acid esters, of diethylene glycol monobenzoate.

2. The coating composition of claim 1 wherein said $R^1$ is a 2-ethylhexyl.

3. The coating composition of claim 1 wherein said benzoic ester blend comprises: a benzoate of 8-carbon monocarboxylic acid from about 15 to about 20%; diethylene glycol dibenzoate from 60 to about 65%; and diethylene glycol monobenzoate from about 20 to about 25%.

4. The coating composition of claim 1 wherein said mixture of benzoic acid esters comprises about 17 weight percent of $PhCO(O)R^1$, about 62 weight percent diethylene glycol dibenzoate, and about 21 weight percent diethylene glycol monobenzoate.

5. The coating composition of claim 1 wherein said metal cross-linking agent is calcium.

6. The coating composition of claim 1 further comprising a wax component or a mixture of waxes.

7. The coating composition of claim 1 further comprising an alkali-soluble resin.

8. The coating composition of claim 1 further comprising a coalescent.

9. The coating composition of claim 1 wherein said composition comprises less than 1% volatile organic compounds.

10. The coating composition of claim 1 further comprising one or more of the following: a defoamer, a wetting agent, a stabilizer, a biocide, an anti-slip agent, a performance enhancers, a whitening agents, polycarbonate, an anti-soiling/stain blocking agent, a matting agent and/or mixture thereof.

11. The coating composition of claim 1 wherein said coating composition is a floor surface coating composition comprising
   at least one polymer selected from the group comprising:
   (1) homopolymers and copolymers of acrylic and methacrylic acids;
   (2) said copolymers wherein a portion of repeating units are derived from at least one acid selected from the group consisting of acrylic and methacrylic acids;
   (3) copolymers of styrene and at least one member selected from the group consisting of acrylic and methacrylic acids; and
   (4) homopolymers and copolymers of vinyl acetate.

12. The floor surface coating composition according to claim 11 wherein said polymer is styrene free.

13. The floor surface coating composition of claim 11 wherein said polymer is present in an aqueous medium.

14. The floor surface coating composition according to claim 11 wherein said permanent plasticizer mixture is from about 0.1 to about 40 weight percent of said film forming composition.

15. The floor surface coating composition according to claim 11 wherein said aqueous medium is about 10 to about 95 weight percent of said film forming composition.

16. The composition according to claim 11 wherein said composition is a liquid at 5° C.

17. An aqueous floor coating composition comprising:
   30% solids weight percent solids, and from about 5 to about 50% of a polymer/metal crosslinking complex, and from about 0.1% to about 10% of a plasticizer, said plasticizer comprising plasticizing agent comprises from about 40% to about 60% tributoxyethyl phosphate and the remainder a blend of benzoic esters comprising
   (a) from about 15 to about 20 weight percent, based on the total weight of the mixture of benzoic acid esters, of an ester represented by the formula $PhCO(O)R^1$ where Ph represents a phenyl radical and $R^1$ represents a linear or branched alkyl radical containing 8 carbon atoms,
   (b) from about 60 to about 65 weight percent, based on the total weight of the mixture of benzoic acid esters, of diethylene glycol dibenzoate, and
   (c) from about 20 to about 25 weight percent, based on the total weight of the mixture of benzoic acid esters, of diethylene glycol monobenzoate; and
   wherein said floor coating composition contains between about 1.14% and 1.71% of TBEP.

18. The composition according to claim 17 where $R^1$ is 2-ethylhexyl.

19. The composition according to claim 17 wherein said mixture contains about 17 weight percent of $PhCO(O)R^1$, about 62 weight percent of diethylene glycol dibenzoate and about 21 weight percent of diethylene glycol monobenzoate.

20. The composition of claim 17 further comprising wax in an amount of about 0.1% to 15% by weight of the composition.

21. The composition of claim 17 further comprising a coalescent in an amount of about 0.1% to 10% by weight of the composition.

22. The composition of claim 17 further comprising an alkali soluble resin in an amount of about 0.1% to 15% by weight of the composition.

23. A plasticizer for use in film forming compositions comprising:
from about 40% to about 60% tributoxyethyl phosphate and the remainder a blend of benzoic esters comprising
(a) from about 15 to about 20 weight percent, based on the total weight of the mixture of benzoic acid esters, of an ester represented by the formula $PhCO(O)R^1$ where Ph represents a phenyl radical and $R^1$ represents a linear or branched alkyl radical containing 8 carbon atoms,
(b) from about 60 to about 65 weight percent, based on the total weight of the mixture of benzoic acid esters, of diethylene glycol dibenzoate, and
(c) from about 20 to about 25 weight percent, based on the total weight of the mixture of benzoic acid esters, of diethylene glycol monobenzoate.

24. The plasticizer according to claim 23 where $R^1$ is 2-ethylhexyl.

25. The plasticizer according to claim 23 wherein said mixture contains about 17 weight percent of $PhCO(O)R^1$, about 62 weight percent of diethylene glycol dibenzoate and about 21 weight percent of diethylene glycol monobenzoate.

26. The plasticizer of claim 23 wherein said TBEP is in an amount of about 60% by weight of the plasticizer composition.

* * * * *

UNITED STATES PATENT AND TRADEMARK OFFICE
CERTIFICATE OF CORRECTION

PATENT NO. : 8,440,751 B2
APPLICATION NO. : 12/782300
DATED : May 14, 2013
INVENTOR(S) : Timothy John Kohnke et al.

It is certified that error appears in the above-identified patent and that said Letters Patent is hereby corrected as shown below:

In the Claims:

Col. 12, Line 19, Claim 10:
ADD after and/or --a--

Signed and Sealed this
Thirtieth Day of July, 2013

Teresa Stanek Rea
*Acting Director of the United States Patent and Trademark Office*